Patented Feb. 6, 1923.

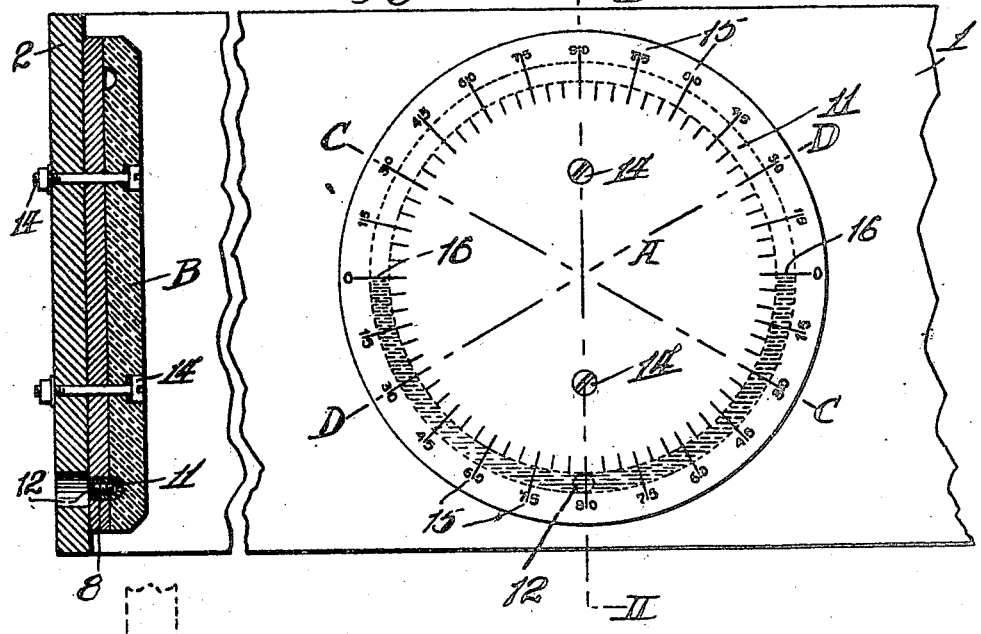
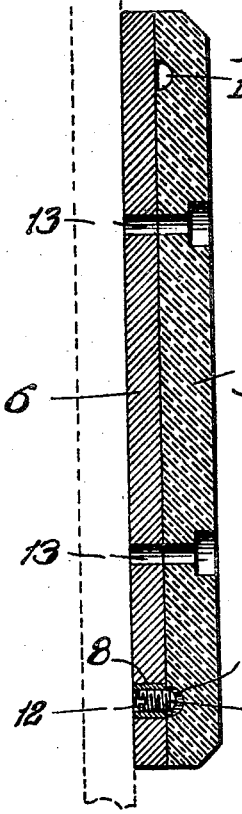
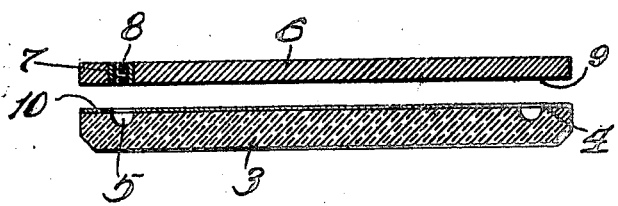

1,444,444

UNITED STATES PATENT OFFICE.

LINN B. BABCOCK, OF ST. LOUIS, MISSOURI.

ANGLE METER.

Application filed December 23, 1920. Serial No. 432,714.

*To all whom it may concern:*

Be it known that I, LINN B. BABCOCK, a citizen of the United States of America, and a resident of the city of St. Louis, and State of Missouri, have invented certain new and useful Improvements in Angle Meters and the Manufacture Thereof, of which the following is a specification.

One of the objects of this invention is to provide an angle meter or inclination indicator which is designed to indicate to an aviator the inclination of his machine from the horizontal.

Another object of the invention is to provide an improvement in angle meters of the character containing an annular hollow transparent ring or tubular member.

A further object of the invention is to provide an improvement in the manufacture of annular hollow transparent indicating devices.

Other and further objects will appear in the specification and be specifically pointed out in the appended claims, reference being had to the accompanying drawings exemplifying the invention, and in which, Figure 1 is a view, partly in section, showing a pair of these improved devices respectively applied to longitudinally and transversely arranged instrument boards of an airplane.

Figure 2 is an enlarged vertical section taken on the line II—II of Fig. 1.

Figure 3 is a constructional view showing how the parts are mounted together for providing the annular enclosed passage way or chamber.

With reference to the drawings Figure 1 represents a pair of vertically held instrument boards 1 and 2, the instrument board 1 being arranged longitudinally relative to the direction of flight of an airplane, whereas, the instrument board 2 is arranged transversely of the airplane and in front of the operator thereof, the instrument board 1 bearing a vertically held angle indicating meter A, whereas the instrument board 2 has secured thereto a vertically arranged like instrument B.

Each of said instruments are provided with an endless annular passage way in which is contained a colored indicating fluid, the fluid occupying approximately one-half of the area of each passage way, and there being a chart or series of indicating characters arranged around each passage way so that the operator can at a glance readily ascertain the inclination at which the airplane is riding either transversely or longitudinally by reading the opposing surfaces of the leveling fluid of each annular passage way in connection with co-operable characters therewith, the instrument A registering the angle of flight while the instrument B will register the transverse or axial tilting.

On account of the difficulties encountered in manufacturing endless or annular passageways from tubular glass and in which accuracy cannot be relied upon this improved device is made in two parts, in which a flat body portion 3 of glass or other suitable non-porous material is provided, and on one of its surfaces as designated at 4 an annular smooth groove 5 is turned or formed, said surface 4 being ground and polished so as to be perfectly level. A second flat body portion 6 of suitable non-porous material is then provided, and formed transversely therethrough so as to be in alinement with the groove 5 of the body portion 3 is an opening 7, in which is cemented an interiorly threaded sleeve 8. The surface 9 of said body portion 6 is ground and polished so as to be perfectly level, and a transparent cement designated as 10 is coated over the surface 4 of the body portion 3 after which the polished surface 9 of the body portion 6 is firmly engaged against the cement coat and the body-portions 3 and 6 are pressed together and held in their pressed positions until the cement therebetween has thoroughly set, thereby forming the groove 5 into an endless sealed passageway 11.

After the firmly securing of the body portions 3 and 6 together, a colored fluid is filled into the passage way through the sleeve 8 until the fluid poured therein approximately half fills the passage way when the device is vertically held, then the sleeve 8 is closed and sealed by the introduction of a threaded plug 12 therein.

For mounting the instruments to their respective instrument boards in vertical positions, openings such as 13 are provided through which securing members 14 are passed for securing them to the board. Each instrument is provided with a dial which is comprised of a plurality of diametrically opposing characters 15 and in which said characters may be etched upon the outer or inner surfaces of the transparent body portion 3, or the dial may be comprised of an inlay arranged between the body portions 3 and 6.

In the use of a pair of these improved devices when used in the positions as shown in Fig. 1, in connection with an airplane or other vehicle, if the surfaces 16 contained in the passage way 11 of the meter or instrument A alined with opposing characters 15 as designated on the line C, then the aviator would know that his airplane was traveling downwardly at an angle of thirty degrees whereas if the leveling surfaces 16 alined and registered with opposing characters as designated on the line D, such registering would indicate that the airplane is traveling upwardly at an angle of thirty degrees. From the above description of the operation it is obvious that when the indicating surfaces 16 register with the opposing zero marks of the characters 15, the indication is that the airplane is traveling horizontally.

With the instrument B arranged transversely of the airplane and forwardly of the aviator, the axial tilting of the airplane by the co-operation of the surfaces 16 of the fluid contained within the endless passage way with the opposing characters will indicate the transverse inclination of the airplane when banking.

In order to provide accurate registration of the indicating surfaces 16 of the fluid within the annular passage way 11 during climatic changes in which the fluid is subjected to contraction and expansion, in the event that the surfaces 16 register above a set of diametrically opposing characters due to expansion of the fluid, the threaded plug 12 contained in the sleeve 8 is operated towards withdrawal thereof, thereby increasing the area beneath the leveling surfaces 16 of the fluid until the surfaces have descended to alining registration with the pair of opposing characters, which are being used as a gage test. If the surfaces 16 of the fluid register below a pair of opposing characters, due to contraction of the fluid, the plug 12 is then operated in a driving-in direction thereby forcing the leveling surfaces 16 of the fluid to a position of proper registration with the testing set of opposing characters.

In order to prevent the indicating surfaces 16 of the fluid jumping or operating jerkily, due to the abrupt motions of an airplane, and so that said surfaces will operate slowly the threaded plug 12 is designed so as to have its protruding end 17 project at all times within the passage way 11 and provide a restricted portion 18 within said passage way, said restricted portion being adapted to retard the flow of the fluid.

While the operation pertaining to this improved device discloses its usefulness in connection with airplanes, it is obvious that the theme thereof is to provide a level or angle indicator.

What I claim is:

1. An indicator for indicating tilting comprising transparent means forming an annular passageway containing an indicating fluid and normally disposed in a vertical plane, said means having a portion adjustably extending within the passageway adjacent the lower segment thereof for restricting the flow of fluid contained in said passageway.

2. An angle meter for indicating inclination to the horizontal comprising a body portion having an annular groove formed therein, a second body portion secured and sealed to said first body portion, thereby providing an enclosed annular passage way in which is contained an indicating fluid, and indicating marks borne by one of said body portions for co-operation with said fluid, and an adjustable member extending within said passage way for engagement with said fluid.

3. An angle meter for indicating inclination to the horizontal comprising a body portion having an annular groove formed therein, a second body portion secured in a seal tight manner to said first body portion, thereby providing an enclosed annular passage way, in which is contained an indicating fluid, and indicating marks borne by one of said body portions for co-operation with the upper surfaces of the fluid.

LINN B. BABCOCK.